Patented Sept. 18, 1923.

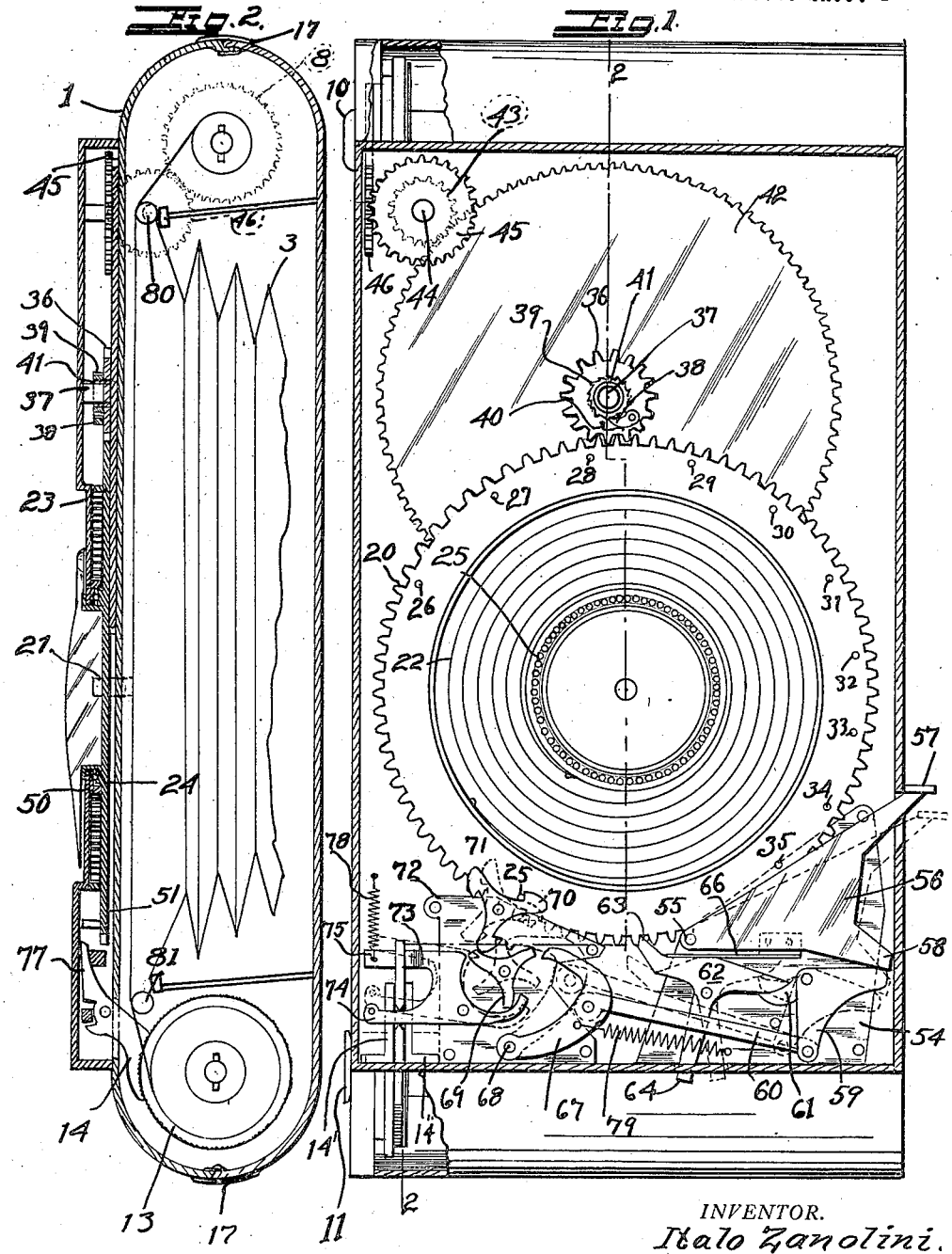

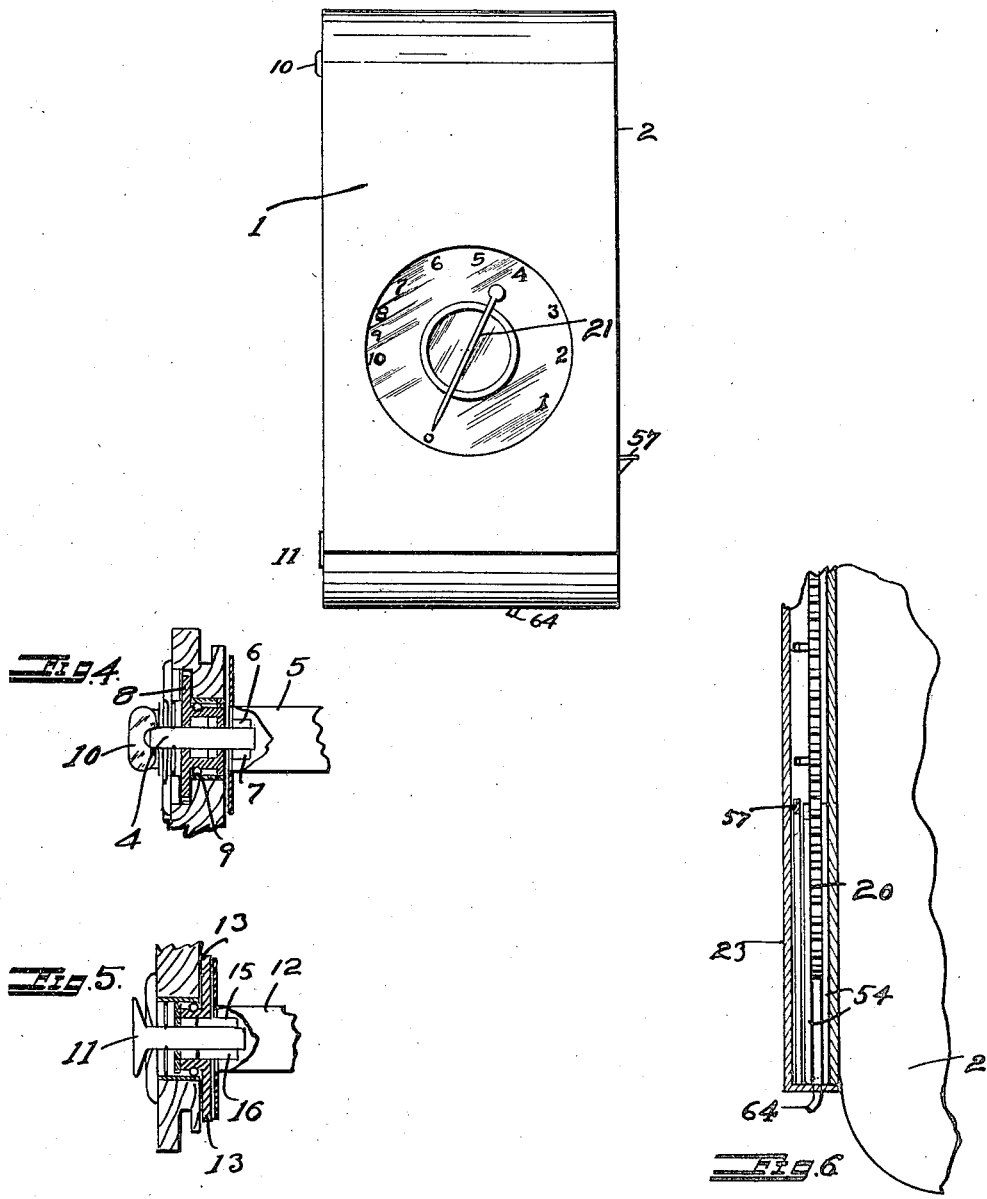

1,468,191

UNITED STATES PATENT OFFICE.

ITALO ZANOLINI, OF BERKELEY, CALIFORNIA.

AUTOMATIC FEEDER FOR ROLL-FILM CAMERAS.

Application filed November 15, 1921. Serial No. 515,231.

*To all whom it may concern:*

Be it known that I, ITALO ZANOLINI, a citizen of the United States, residing at Berkeley, in the county of Alameda, State of California, have invented a new and useful Automatic Feeder for Roll-Film Cameras, of which the following is a specification in such full and clear terms as will enable those skilled in the art to construct and use the same.

This invention relates to an automatic feeder for roll film cameras and its object is to provide means whereby the person using the camera will simply depress a lever whereupon the feeding apparatus will rotate the film spool the necessary amount to take up the blank paper at the end of a film, and after the blank paper has been taken up will draw the film through the camera step by step, each movement being sufficient to place a fresh film in the proper position to have an impression made thereupon.

A further object of the invention is to produce a feeding device which will compensate for the changed diameter of the spool of film, so that the same amount of film will be drawn off the fresh roll each time regardless of the fact that the roll upon which the film is being wound is not turned the precise number of turns near either end of the roll that it is turned near the middle of the film.

Another object of the invention is to provide means whereby the roll carrying the fresh film will be retarded sufficiently near the end of the movement of the film to hold the film tight.

Another object of the invention is to provide the back of the camera with a convenient indicator which will not only show the number of films that have been used but can also be used to wind the spring which operates the feeder.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a back view of the camera with the cover enclosing the operating mechanism removed for purpose of illustration.

Fig. 2 is a vertical sectional view of the camera looking at right angles Figure 1, the lens carrying and focusing apparatus being omitted.

Fig. 3 is a back view of the camera as it appears with the cover for the operating mechanism in place.

Fig. 4 is a sectional view of the hand feed apparatus on the upper film roll.

Fig. 5 is a vertical sectional view of the pivot pin for the lower film roll, and Fig. 6 is a view of a portion of the driving gear showing the pins thereon and illustrating its relation to the frame carrying the releasing pawl and releasing lever.

This apparatus is assembled on the removable back 1 of a common form of camera 2 having the usual bellows 3 for confining the light to the film, and having the usual focusing apparatus which forms no part of the present invention.

At the top of the camera there is a slidable pin 4 which engages the end of the spool 5 upon which the film is to be wound. This pin has lugs 6 and 7 such as are commonly used to rotate the film spool 5. This pin is slidable through a small gear 8, said gear being held in its proper place by means of suitable ball bearings 9. The pin 4 is slidable longitudinally to engage or disengage it from the spool 5 which is rotated by the gear 8 or may be rotated by hand by the user engaging the handle 10.

At the lower end of the camera there is a pin 11 which is slidable longitudinally to be engaged or disengaged from the spool of fresh film 12. This pin is slidable through the hub of a disk 13, said disk being engaged by the brake lever 14, as will be later more fully explained to prevent the film roll 12 from unwinding too rapidly.

The pin 11 has two lugs 15 and 16 which engage the spool 12 and enable the disk 13 to prevent its too rapid rotation.

The driving mechanism is all assembled upon the cover 1, said cover being of an ordinary form detachable from the camera body proper and having a spring latch 17 of any approved design for holding the camera and back together.

The driving mechanism comprises a large gear 20 with an operating handle and pointer 21, which handle serves to wind up the spiral spring 22 enclosed within the gear and under the casing 23. The gear is provided with a flange 24 and with a series of balls 25 to act as an end friction bearing for the gear.

This gear carries a series of pins 25 to 35 inclusive, the pins being spaced apart as experiment shows is necessary to wind up the desired amount of film with each movement of the gear 20.

The gear 20 is in mesh with a smaller gear 36 loosely mounted on a stud shaft 37, and this gear has a pawl 38 held in engagement with a ratchet wheel 39 by means of a light spring 40. The ratchet wheel 39 is carried by a tube 41 to which the gear 42 is connected. The object of the pawl is to prevent the reverse rotation of any save the gears 20 and 40 when the spring is being unwound.

The gear 42 is in mesh with a small gear 43 on a short shaft 44, said shaft also carrying a larger gear 45 which has teeth of such shape as to be meshed at right angles to the teeth of the gear 46. The gear 46 is in mesh with the gear 8 which drives the pin 4 to rotate the spool upon which the film is to be wound.

The casing back 23 has a flange 50 to which one end of the spring 22 is connected, said spring being connected at its other end to the flange 51 at the outer portion of the gear 20 to rotate it. At the bottom of the back there is a U-shaped plate 54. This plate forms the support for the pivot pin 55 carrying the lever 56, which lever projects from the camera case as indicated at 57 in order for the operator to trip it.

The lever 56 has a heel piece 58 which bears upon a bell crank lever 59 in turn connected to a link 60. The bell crank 59 has a heel piece 61 which bears upon another lever 62. The lever 62 has the pawl 63 which engages and stops the gear 20, and in order that it may be worked by hand it has a projecting point 64.

At the bottom of the enclosing casing a flat spring 66 is secured to the U-shaped support 54 to hold the pawl 63 engaged with or disengaged from the gear 20. The link 60 is connected to a hook shaped lever 67 pivoted at 68 to engage one of the escapement wheels 69.

The escapement wheel 69 has three arms and it in turn engages the three-armed escapement 70 pivotally mounted at 71 and capable of engaging the pins 25 to 35 on the gear 20. The lever 67, escapement wheel 69 and escapement stop 70 are all pivoted on a plate 72 secured within the casing at the back and below the gear 20. The plate 72 also supports a lever 73 which has two arms 74, 75.

The arm 75 engages a notch in the brake lever 14 so that when it is raised it releases the brake from the disk wheel 13, but when it is lowered, the arm 75 engages the back of the brake arm 77 and causes the spool carrying the supply of film to be held back enough to insure drawing up the film snugly and smoothly.

The lever 14 is pivotally mounted in two brackets 14' and 14''. A spring 78 insures the proper operation of the lever 73, while a spring 79 insures the lever 56 being restored to its initial position.

The operation of the apparatus is as follows: When the user has placed a fresh film in the lower portion of the camera, he will in the usual manner engage the upper end of the film with the upper spool passing it over the two small rollers 80, 81 at the back of the camera to hold it in the proper fixing plane. The spring 22 will then be wound up by rotation, the pointer 21 moving from zero around to zero again one turn. This will not rotate any gears except the gears 20 and the small gear carrying the pawl 38; thereupon the back will be engaged with the camera and locked in position. This will bring the two gears 45, 46 into contact and when the operator desires to make the first exposure he will depress the lever 56. This will release the pawl 63, at the same time the escapement mechanism will be rotated a portion of one turn so that the next pin on the gear 20 will strike the escapement stop, thereby leaving the film in the proper position to take the first picture. Thereafter each time the lever 56 is pressed once, one more film will be moved from the exposed position to the concealed position on the storage roller at the top of the camera.

During the carrying out of these operations, the brake 14 will be shifted to bear upon or release the disk 13. It will also be noted that the pins 33, 34 are not as far apart as the pins 26, 27. The object of this is to provide for the changed rolled diameter, because as the roll increases in diameter the number of turns it has to make to wind up a given amount of film varies.

The apparatus may be equally well used for different sized films in different forms of cameras, and for a larger or smaller number of film exposures, the present apparatus being intended to operate on films having ten exposures.

What I claim is as follows, but various modifications may be made in the construction shown in the drawings and above particularly described form, within the purview of my invention:

1. A camera of the class described comprising a camera, a removable back therefor, a spring secured to the back at one end, a wheel adapted to be rotated by said spring, a series of stops on the wheel, a film storage spool, and means whereby the wheel will operate said storage spool intermittently to cause an exposed length of film to be wound thereon.

2. A camera of the class described comprising a casing, a pair of film spools therein, a removable back therefor, a spring secured to the back at one end, means connected with said spring to rotate one of the film spools step by step to present a fresh length of film to the exposure position, an escapement to allow a given amount of film to be wound up with each movement, and a lever projecting from the camera to release the escapement to permit the movements to take place as may be desired.

In testimony whereof I have hereunto set my hand this 31st day of October A. D. 1921.

ITALO ZANOLINI.